United States Patent
Kim et al.

(10) Patent No.: US 9,989,647 B2
(45) Date of Patent: Jun. 5, 2018

(54) MOBILE TERMINAL AND POSITIONING SATELLITES SELECTING METHOD THEREOF

(71) Applicant: LG ELECTRONICS INC., Seoul (KR)

(72) Inventors: Dongseon Kim, Seoul (KR); Hangle Shin, Seoul (KR)

(73) Assignee: LG ELECTRONICS INC., Seoul (KR)

(*) Notice: Subject to any disclaimer, the term of this patent is extended or adjusted under 35 U.S.C. 154(b) by 1170 days.

(21) Appl. No.: 13/725,811

(22) Filed: Dec. 21, 2012

(65) Prior Publication Data
US 2013/0162468 A1 Jun. 27, 2013

(30) Foreign Application Priority Data
Dec. 23, 2011 (KR) .................. 10-2011-0141468

(51) Int. Cl.
*G01S 19/28* (2010.01)
*G01S 19/32* (2010.01)
(Continued)

(52) U.S. Cl.
CPC ............. *G01S 19/28* (2013.01); *G01S 19/32* (2013.01); *G01S 19/33* (2013.01); *G01S 19/46* (2013.01)

(58) Field of Classification Search
CPC ........... G01S 19/28; G01S 19/32; G01S 19/33
See application file for complete search history.

(56) References Cited

U.S. PATENT DOCUMENTS

| 5,248,981 A * | 9/1993 | Yoshihara ............... G01S 19/14 342/357.25 |
| 6,075,987 A * | 6/2000 | Camp, Jr. ............... G01S 19/05 342/357.43 |

(Continued)

FOREIGN PATENT DOCUMENTS

| CN | 1571581 | 1/2005 |
| CN | 1740806 | 3/2006 |
| WO | 2006/113689 | 10/2006 |

OTHER PUBLICATIONS

R.W. Parkinson et al., Global Positioning System: Theory and Applications, vol. 1; Progress in Astronautics and Aeronatics, vol. 163, American Institute of Aeronautics and Astronautics, Inc., p. 10-11, 1996.*

(Continued)

*Primary Examiner* — Bernarr E Gregory
*Assistant Examiner* — Fred H Mull
(74) *Attorney, Agent, or Firm* — Lee Hong Degerman Kang & Waimey

(57) ABSTRACT

A mobile terminal capable of selecting optimum satellites among a plurality of positioning satellites and a method of selecting positioning satellites are disclosed with reference to embodiments of the present invention. If DOP (dilution of precision) increases as the number of positioning satellites increases, satellites to be used for positioning are automatically selected from GNSS satellites based on satellite information and a user's menu setting. This can enhance the accuracy of positioning and can reduce battery consumption. In particular, satellites for positioning are spaced from each other by a prescribed distance to reduce DOP, thereby enhancing the accuracy of positioning. Further, multipath signals are reduced in order to enhance the accuracy of positioning.

27 Claims, 9 Drawing Sheets

(51) Int. Cl.
*G01S 19/33* (2010.01)
*G01S 19/46* (2010.01)

(56) References Cited

U.S. PATENT DOCUMENTS

| | | | | |
|---|---|---|---|---|
| 6,721,656 | B2* | 4/2004 | Morita | G01S 19/42 |
| | | | | 701/469 |
| 2001/0048387 | A1* | 12/2001 | Sheynblat | G01S 5/0063 |
| | | | | 342/357.67 |
| 2004/0189515 | A1* | 9/2004 | Vannucci | G01S 19/03 |
| | | | | 342/357.29 |
| 2005/0162307 | A1* | 7/2005 | Kato | G01S 19/32 |
| | | | | 342/357.62 |
| 2007/0188380 | A1* | 8/2007 | Duong | G01S 19/36 |
| | | | | 342/374 |
| 2008/0191935 | A1 | 8/2008 | Tidwell | |
| 2009/0213004 | A1* | 8/2009 | Rhodes | G01S 19/06 |
| | | | | 342/357.43 |
| 2011/0210889 | A1* | 9/2011 | Dai | G01S 19/235 |
| | | | | 342/357.29 |

OTHER PUBLICATIONS

Group. (2011). The American Heritage Dictionary of the English Language (5th ed.). Boston, MA: Houghton Mifflin. Retrieved from http://search.credoreference.com/content/entry/hmdictenglang/group/0.*

Terminal. (2011). The American Heritage Dictionary of the English Language (5th ed.). Boston, MA: Houghton Mifflin. Retrieved from http://search.credoreference.com/content/entry/hmdictenglang/terminal/0.*

State Intellectual Property Office of the People's Republic of China Application Serial No. 201210562616.9, Office Action dated Mar. 2, 2016, 11 pages.

European Patent Office Application Serial No. 12198652.5, Search Report dated Apr. 18, 2013, 6 pages.

* cited by examiner

LARGE DOP(BAD ARRANGEMENT)

SMALL DOP(GOOD ARRANGEMENT)

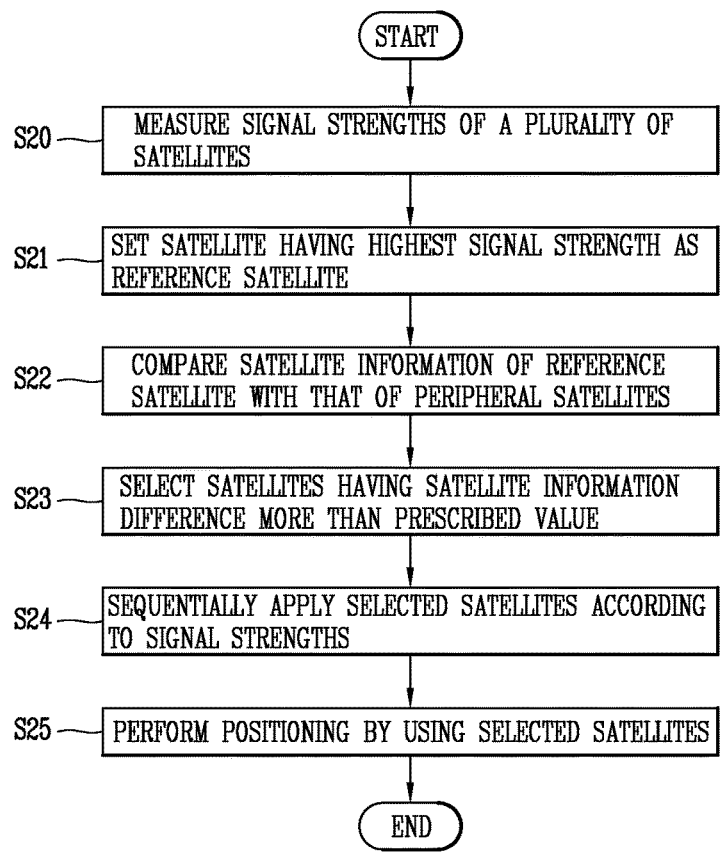
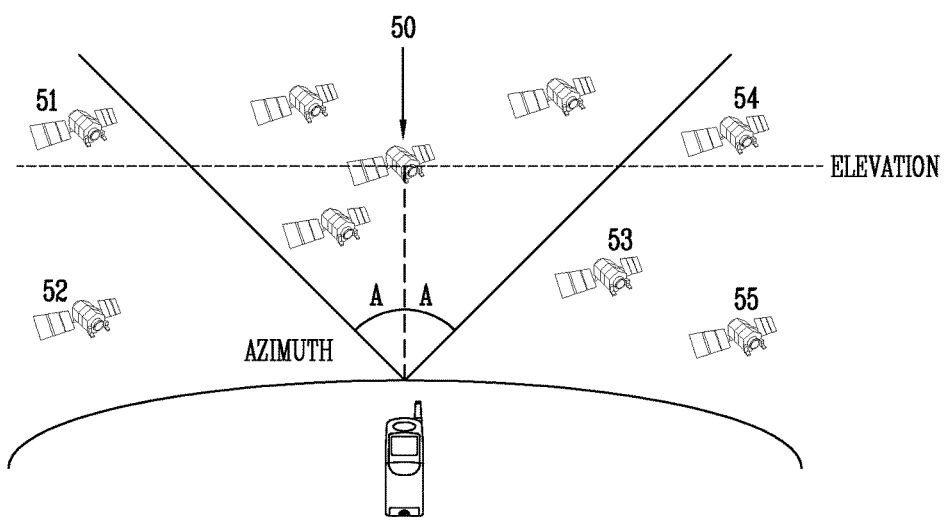

MOBILE TERMINAL AND POSITIONING SATELLITES SELECTING METHOD THEREOF

CROSS-REFERENCE TO RELATED APPLICATIONS

Pursuant to 35 U.S.C. § 119(a), this application claims the benefit of earlier filing date and right of priority to Korean Application No. 10-2011-0141468, filed on Dec. 23, 2011, the contents of which are hereby incorporated by reference herein in their entirety.

TECHNICAL FIELD

Embodiments of the present invention relate to a mobile terminal, and particularly, to a mobile terminal capable of selecting an optimum satellite among positioning GNSS (Global Navigation Satellite System) satellites, and a method of selecting positioning satellites.

BACKGROUND

In general, a mobile terminal is configured to perform various functions. These various functions include video and voice call communications, capturing still or moving images using a camera, storing voice, reproducing music file(s) through a speaker system, displaying image or video, etc. Some mobile terminals include additional functions such as playing games, and other mobile terminals are implemented as multimedia players. Moreover, recent mobile terminals are configured to allow a user to view video or television programs by receiving broadcast or multicast signals.

Various attempts have been made to implement enhanced functions of the mobile terminal not only by structural improvements, but also by hardware or software improvements. A touch function of the mobile terminal allows a user having a difficulty in inputting buttons or keys to conveniently operate the mobile terminal by using a touch screen. Recently, this touch function is considered as an important function of the mobile terminal, together with a User Interface (UI) as well as a simple input function. As the touch function is applied to the mobile terminal in various ways, developing a suitable UI is required to a larger extent.

The mobile terminal provides a user with a Location-Based Service (LBS). The LBS may include a radio contents service for informing a user of his measured position, or specific information regarding the measured position.

Positioning using the LBS often includes a satellite-based positioning method for performing positioning based on a signal received from a satellite, and a base station-based positioning method for performing positioning based on a positional relationship between a base station and a mobile terminal. The satellite-based positioning method is advantageous in that the accuracy is high, and positioning can be performed while a user is moving since the mobile terminal is not influenced by a radio network environment.

Global Navigation Satellite System (GNSS) satellites which provide information on a position, an elevation, a speed, etc. of an object by using a satellite, include the Chinese COMPASS under development, the Japanese QZSS, the European Galileo, etc., as well as the American GPS and the Russian GLONASS. It is expected that the number of GNSS satellites will be more than 100 in 2013.

If the same type of satellites are used (e.g., if the number of GPS satellites increases), the accuracy of positioning is enhanced. However, if different types of GNSS satellites are used, a dilution of precision (DOP) increases. That is, as the number of satellites increases, signals of more densely arranged satellites are received, thereby lowering the accuracy of positioning.

Further, in the conventional art, signal strengths of GNSS satellites should be checked so that a specific satellite can be selected from a plurality of satellites. This may increase battery consumption (power consumption) of the mobile terminal.

SUMMARY

According to an embodiment of the present invention, a mobile terminal is capable of automatically selecting positioning satellites based on satellite information. A method of selecting positioning satellites by a mobile terminal is also disclosed according to an embodiment of the present invention.

According to another embodiment, a mobile terminal is capable of reducing power consumption and enhancing the accuracy of positioning, by selecting positioning satellites within a short time.

To achieve these and other features, embodiments of the present invention are disclosed herein. According to one embodiment, a method of selecting positioning satellites by a mobile terminal includes: storing setting information regarding a plurality of satellites; sequentially selecting satellites, which satisfy a condition relating to dilution of precision (DOP), based on satellite information and the stored setting information, while the mobile terminal is operating in a satellite mode set by a user during a position search; and performing positioning using the selected satellites.

The setting information may be information selected from a satellite setting menu by a user, and may include a satellite mode, a satellite type, a satellite selecting procedure, satellite selecting priorities per area, and the number of satellites to be selected.

A GNSS satellite may be included in a free satellite system or a pay satellite system, and may include GPS, GLONASS, COMPASS, QZSS Galileo satellites.

The satellite information may include a signal strength, an azimuth and an elevation, and may be directly measured from a satellite signal or may be received to from an external server.

The method may further comprise: performing positioning using GPS satellites if no satellite mode has been set, or if a GPS mode has been set; selecting satellites by converting from a GPS mode to a GNSS mode if a signal strength or positioning accuracy becomes less than a prescribed value while positioning is performed by the GPS satellites; and compensating for the positioning by the selected satellites.

When converting from the GPS mode to the GNSS mode, a pop-up message may be displayed inquiring a user whether to convert the current mode or not.

Sequentially selecting satellites may include: selecting a satellite having a highest signal strength as a reference satellite; comparing an azimuth and an elevation of the reference satellite with those of other satellites; selecting satellites having a prescribed difference in azimuth and elevation from the azimuth and the elevation of the reference satellite; and sequentially selecting the selected satellites according to signal strengths or priorities per area.

Selecting the GNSS satellite may include: sorting a plurality of satellites according to at least one candidate sector based on an azimuth and an elevation of the GNSS satellite;

and sequentially selecting, from each candidate sector, satellites having high signal strengths.

The number of the GNSS satellites to be selected may be a minimum number or a maximum number according to setting information.

The method may further include adjusting the number of satellites for positioning based on a signal strength, positioning accuracy, and a remaining charge of a battery of the mobile terminal.

When the number of satellites used for positioning is set to a minimum number, positioning may be performed by using a maximum number of satellites according to priorities if a signal strength or the accuracy of positioning becomes less than a prescribed value.

When the number of satellites used for positioning is set to a maximum number, positioning may be performed by using a minimum number of satellites if a remaining charge of a battery of the mobile terminal is less than a prescribed level.

A mobile terminal is also disclosed according to an embodiment of the present invention. The mobile terminal includes: a memory configured to store setting information regarding a plurality of satellites; a display unit configured to display information regarding satellites; and a controller configured to sequentially select satellites, which satisfy a condition relating to dilution of precision (DOP), based on satellite information and the stored setting information, while the mobile terminal is operating in a satellite mode set by a user during a position search. The controller is further configured to perform positioning or positioning compensation using the selected satellites.

The setting information may be information selected from a satellite setting menu by a user, and may include a satellite mode, a satellite type, a satellite selecting procedure, satellite selecting priorities per area, and the number of satellites to be selected.

The plurality of satellites may be included in a free satellite system or a pay satellite system, and may include GPS, GLONASS, COMPASS, QZSS Galileo satellites.

The satellite information may include a signal strength, an azimuth and an elevation, and may be directly measured from a satellite signal or may be received from an external server.

The controller may be configured to: perform positioning using GPS satellites if no satellite mode has been set or if a GPS mode has been set; select GNSS satellites by converting from the GPS mode to a GNSS mode if a signal strength or the accuracy of positioning becomes less than a prescribed value while positioning is performed by the GPS satellites; and compensate for the positioning by the selected GNSS satellites.

When converting from the GPS mode to the GNSS mode, the controller may display a pop-up message inquiring a user whether to convert the current mode or not.

The controller may be configured to, in the GNSS mode, compare an azimuth and an elevation of a reference satellite having a highest signal strength, with those of other satellites; select satellites having a prescribed difference in azimuth and elevation from the azimuth and the elevation of the reference satellite; and sequentially select the selected satellites according to signal strengths or priorities per area.

The controller may be configured to sort a plurality of satellites according to at least one candidate sector based on azimuths and elevations of the GNSS satellites; and sequentially select, from each candidate sector, satellites having high signal strengths.

The controller may be configured to adjust the number of satellites for positioning, based on a signal strength, positioning accuracy, and a remaining charge of a battery of the mobile terminal.

When the number of satellites used for positioning is set to a minimum value, the controller may perform positioning by using a maximum number of satellites according to priorities if a signal strength or the accuracy of positioning becomes less than a prescribed value.

When the number of satellites used for positioning is set to a maximum value, the controller may perform positioning by using a minimum number of satellites if a remaining charge of a battery becomes less than a prescribed level.

Further applicability of features of embodiments of the present invention will become more apparent from the detailed description given hereinafter. However, it should be understood that the detailed description and specific examples, while illustrating exemplary embodiments of the invention, are provided by way of illustration only, since various changes and modifications that are within the spirit and scope of the disclosed embodiments will become apparent to those skilled in the art from the detailed description.

BRIEF DESCRIPTION OF THE DRAWINGS

The accompanying drawings, which are included to provide a further understanding of disclosed features and are incorporated in and constitute a part of this specification, illustrate various embodiments and together with the description serve to explain principles of embodiments of the invention.

In the drawings:

FIG. 9 is a flowchart illustrating a method of selecting satellites based on a reference position in a GNSS mode according to an embodiment of the present invention;

FIG. 10 illustrates an example of selecting positioning satellites based on a reference position according to the method of FIG. 9;

DETAILED DESCRIPTION

Description will now be provided in more detail regarding particular embodiments, with reference to the accompanying drawings.

Hereinafter, a mobile terminal according to embodiments of the present invention will be described in more detail with reference to the attached drawings. The use of suffixes with reference to various components such as 'module' and 'unit or portion' is merely for ease of description. Therefore, it is not intended that the suffixes have different meanings from each other.

A terminal may be implemented in various forms. For instance, the terminal may include a mobile terminal such as a portable phone, a smart phone, a notebook computer, a digital broadcasting terminal, a Personal Digital Assistant (PDA), a Portable Multimedia Player (PMP), and a navigation system, or a fixed terminal such as a digital TV, a desktop computer, etc. In general, embodiments of the present invention are directed to a mobile terminal. However, it will be appreciated by those skilled in the art that features described herein may be also applicable to a fixed terminal, except for features specifically configured for mobile applications.

Figure 1:
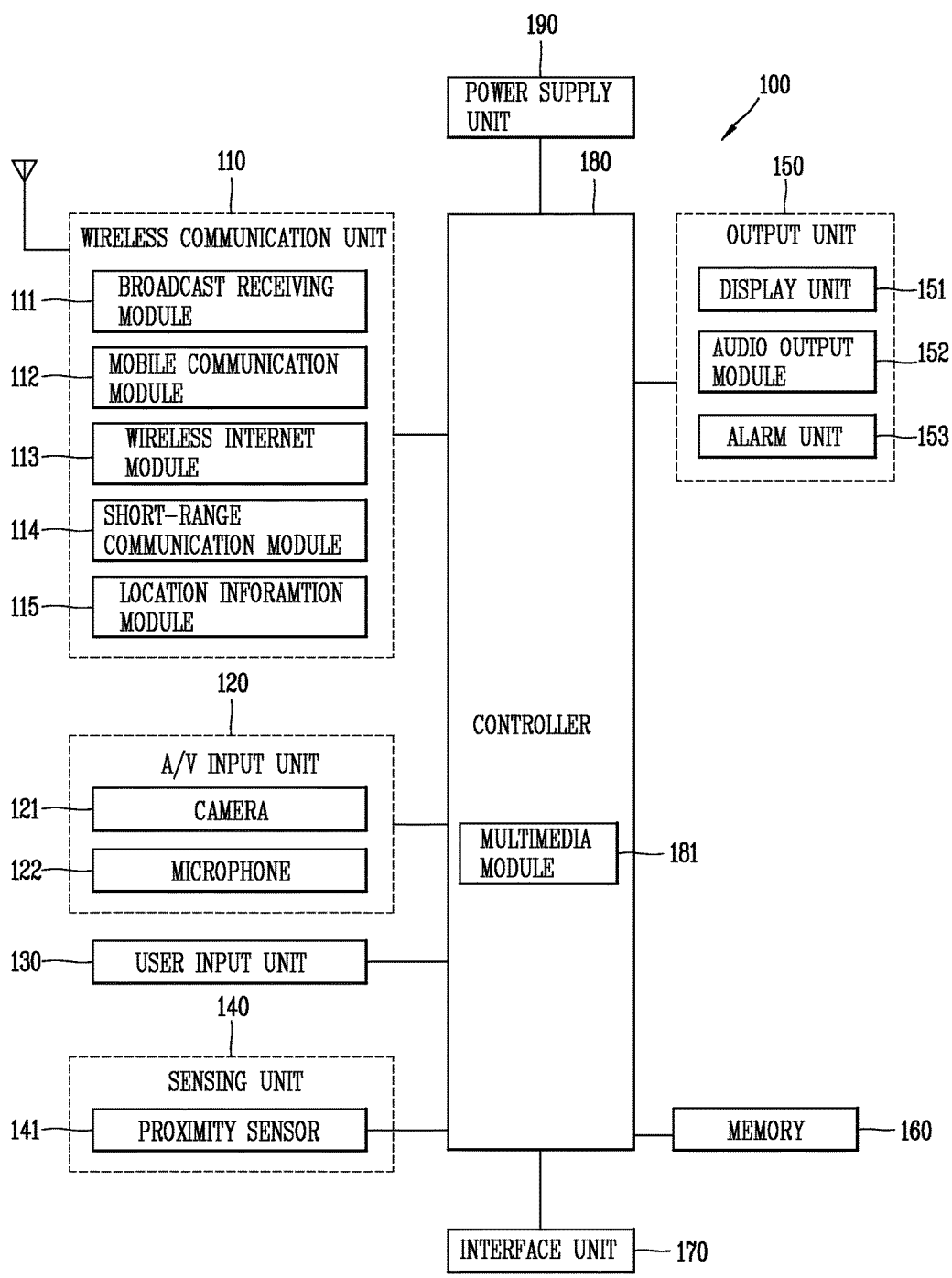
FIG. 1 is a block diagram of a mobile terminal according to an embodiment of the present invention.

FIG. 1 is a block diagram of a mobile terminal 100 according to an embodiment of the present invention.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 illustrates the mobile terminal 100 as having various components, but it is understood that implementing all of the illustrated components is not a requirement. The mobile terminal 100 may be implemented with a greater or a fewer number of components.

The wireless communication unit 110 typically includes one or more components facilitating radio communication between the mobile terminal 100 and a wireless communication system or a network in which the mobile terminal is located. For example, the wireless communication unit 110 may include at least a broadcast receiving module 111, a mobile communication module 112, a wireless Internet module 113, a short-range communication module 114, or a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or another type of storage medium).

The mobile communication module 112 transmits and/or receives radio signals to and/or from at least a base station, an external terminal or a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Regarding the wireless Internet technique, a wireless local area network (WLAN), Wi-Fi, wireless broadband (WiBro), world interoperability for microwave access (WiMAX), high speed downlink packet access (HSDPA), and the like may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal. For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module may acquire speed information calculating a current position in real time.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal of an embodiment of the present invention.

The microphone 122 may receive sounds (audible data) via a microphone in a phone call mode, a recording mode, a voice recognition mode, and the like, and can process such sounds into audio data. The processed audio (e.g., voice) data may be converted for output into a format that may be transmitted to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. in response to being contacted), a jog wheel, a jog switch, and the like. In particular, when the touch pad is overlaid on the display unit 151 in a layered manner, it may form a touch screen.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of movement of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141, which will be described in more detail later in association with a touch screen.

The sensing unit 140 includes a geomagnetic sensor configured to calculate a moving direction when a user moves, a gyro sensor configured to calculate a rotation direction, and an acceleration sensor.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

The identification module may be a memory chip that stores various information for authenticating a user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a conduit to allow power from the cradle to be supplied therethrough to the mobile terminal 100 or may serve as a conduit to allow various command signals input from the cradle to be transferred to the mobile terminal therethrough. Various command signals or power input from the cradle may operate as signals for recognizing when the mobile terminal is properly mounted on the cradle.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call.

When the display unit 151 and the touch pad are overlaid in a layered manner to form a touch screen, the display unit 151 may function as both an input device and an output device. The display unit 151 may include at least a Liquid Crystal Display (LCD), a Thin Film Transistor-LCD (TFT-LCD), an Organic Light Emitting Diode (OLED) display, a flexible display, a three-dimensional (3D) display, or the like. Some of these displays may be configured to be transparent so that an external (or outside) environment may be seen therethrough. Such displays may be referred to as transparent displays. A representative example of a transparent display may include a transparent organic light emitting diode (TOLED), etc. The mobile terminal 100 may include two or more display units 151. For example, the mobile terminal may include both an external display unit and an internal display unit. The touch screen may be configured to detect a touch input pressure as well as a touch input location and a touch input area.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform a user about the occurrence of an event of the mobile terminal 100. Typical events may include call reception, message reception, key signal inputs, a touch input, etc. In addition to audio or video outputs, the alarm unit 153 may provide outputs in a different manner to inform a user about the occurrence of an event. For instance, the alarm unit 153 may output signals in a vibration manner. If a call signal or a message is received, the alarm unit 153 may output vibrations. Alternatively, if a key signal is input, the alarm unit 153 may output vibration as a feedback. Through the output of vibrations, a user can recognize the occurrence of an event. The video signal or the audio signal may be also output via the display unit 151 or the audio output module 152.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output in response to touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs a storage function of the memory 160 on the Internet.

The interface unit 170 may generally be implemented to interface the mobile terminal with external devices. The interface unit 170 may facilitate data reception from an external device, power delivery to each component in the mobile terminal 100, or data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize a writing or drawing input on the touch screen as text or an image.

The power supply unit 190 serves to supply power to each component by receiving external power or internal power under control of the controller 180.

Various embodiments described herein may be implemented in a computer-readable medium using, for example, software, hardware, or some combination of software and hardware.

For a hardware implementation, embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, or other electronic units designed to perform the functions described herein, or a selective combination of the noted devices. Also, embodiments described herein may be implemented by the controller 180.

For a software implementation, procedures or functions described herein with respect to various embodiments may be implemented by separate software modules. Each of the separate modules performs at least functions or operations described herein. Software code can be implemented with a software application written in any suitable programming language. The software code may be stored in the memory 160 and executed by the controller 180.

In addition, the mobile terminal 100 of FIG. 1 may be configured to operate within a communication system which transmits data via frames or packets, including both wireless and wireline communication systems, and satellite-based communication systems.

Hereinafter, a communication system in which a mobile terminal according to an embodiment of the present invention can operate will be described with reference to FIG. 2.

Such a communication system may utilize different air interfaces and/or physical layers. Examples of air interfaces utilized by the communication system include frequency division multiple access (FDMA), time division multiple access (TDMA), code division multiple access (CDMA), universal mobile telecommunications system (UMTS), the long term evolution (LTE) of the UMTS, and the global system for mobile communications (GSM). By way of a non-limiting example, further description will be provided with reference to a CDMA communication system, but it is understood that described features may apply equally to other system types.

Figure 2:
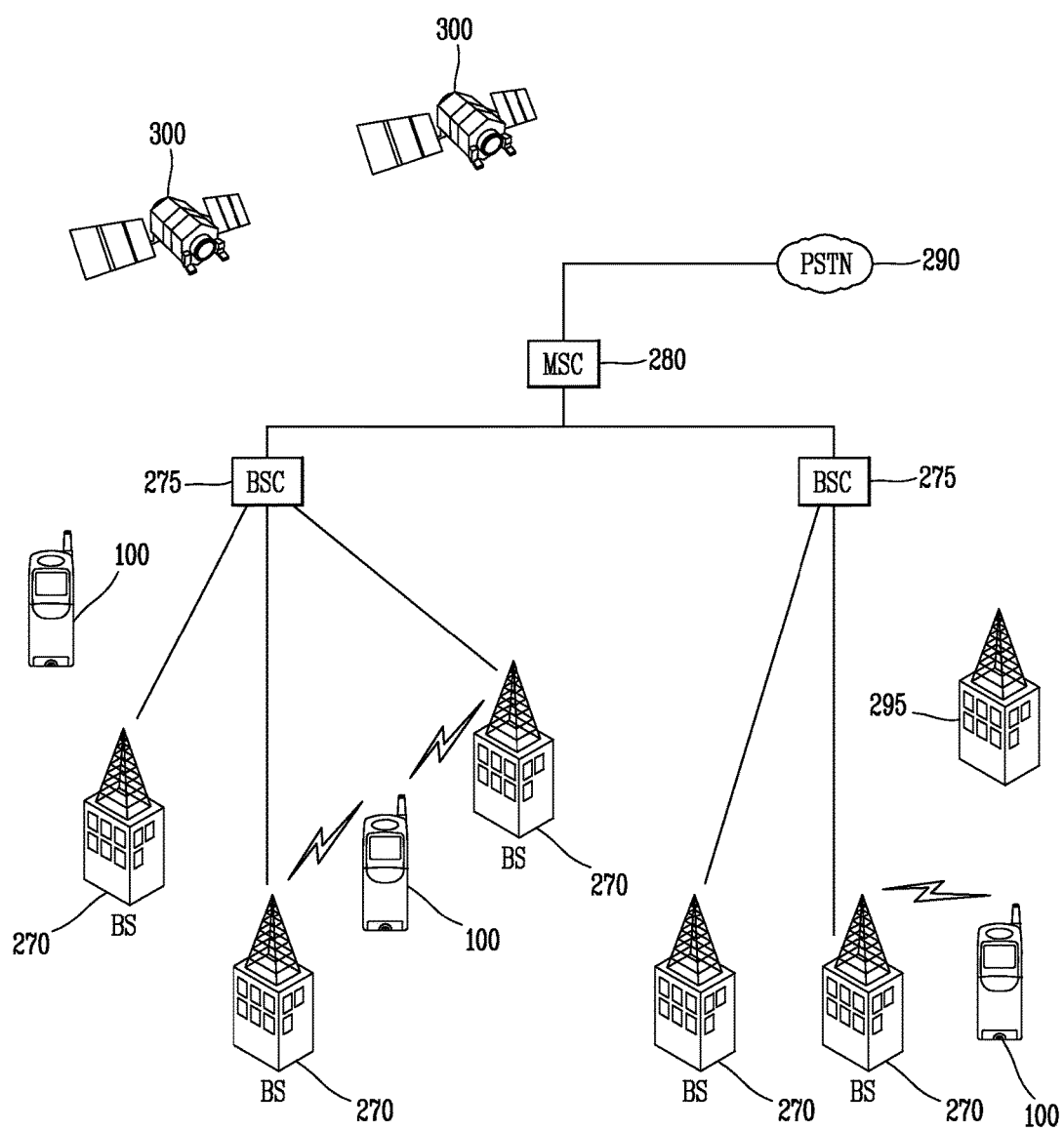
FIG. 2 is a block diagram of a radio communication system where a mobile terminal according to an embodiment of the present invention can be operated.

With reference to FIG. 2, a CDMA wireless communication system may include a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275 and one or more base stations 270. The base stations 270 may also be denoted as "cell sites." Alternatively, individual sectors of a given base station 270 may be referred to as cell sites.

As shown in FIG. 2, a broadcasting transmitter (BT) 295 is configured to transmit broadcast signals to the mobile terminals 100 which operate within the system. In addition, the broadcast receiving module 111 (see FIG. 1) of the mobile terminal 100 is typically configured to receive broadcast signals transmitted by the BT 295.

FIG. 2 further illustrates several global positioning system (GPS) satellites 300. Such satellites 300 facilitate locating the position of some or all of the mobile terminals 100. In FIG. 2, two satellites are shown, but positioning information may be obtained with a greater or fewer number of satellites. In addition, the location information module (or position-location module) 115 (see FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during a typical operation of the wireless communication system, the base stations 270 receive sets of reverse-link signals from various mobile terminals 100. The mobile terminals 100 engage in calls, messaging, and other communications. In addition, each reverse-link signal received by a given base station 270 is processed within that base station 270, and the resulting data is forwarded to an associated BSC 275. The BSC 275 provides call resource allocation and mobility management functionality including soft handoffs between the base stations 270. Further, the BSCs 275 also route the received data to the MSC 280, which provides additional routing services for interfacing with the PSTN 290. Similarly, the PSTN 290 interfaces with the MSC 280, and the MSC 280 interfaces with the BSCs 275. The BSCs 275 also control the base stations 270 to transmit sets of forward-link signals to the mobile terminals 100.

Figure 3:
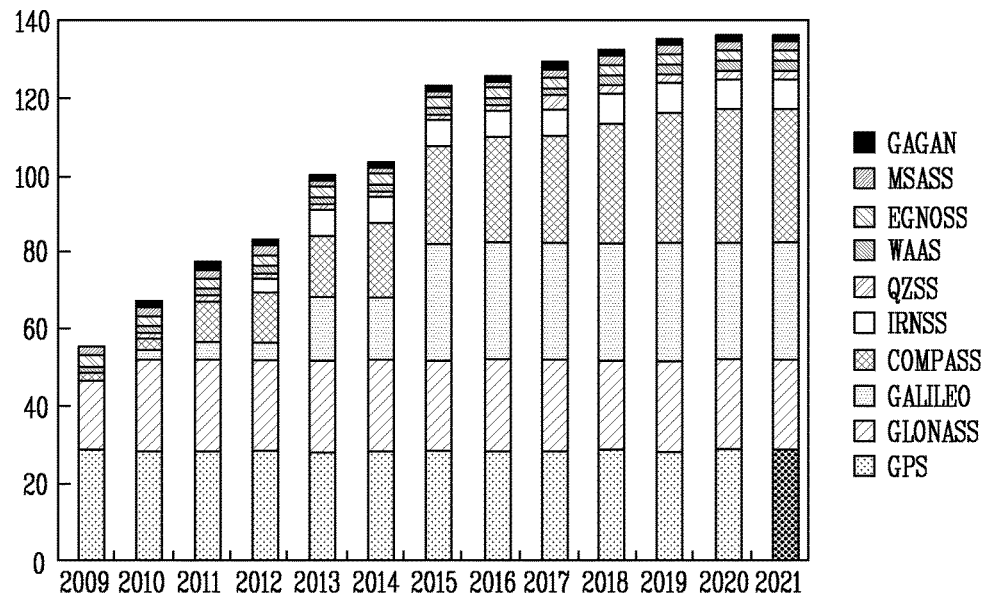
FIG. 3 is a bar graph illustrating a distribution of GNSS (Global Navigation Satellite System) satellites.

FIG. 3 is a bar graph showing a distribution of Global Navigation Satellite System (GNSS) satellites.

With reference to FIG. 3, the GNSS satellites are mainly American GPS and Russian GLONASS. It is expected that the number of the GNSS satellites will be more than 100 in 2013, if the Chinese COMPASS under development, the Japanese QZSS, the European Galileo, etc. are actually used. The GPS satellites are included in a free satellite system, and the GNSS satellites include one or more satellites included in a free satellite system or a pay satellite system.

If the number of satellites increases, a user can be provided with a positioning-based service anywhere in the world. With respect to positioning using a plurality of satellites, the most important factor (or one of the most important factors) is Dilution Of Precision (DOP) indicating a uniform degree in the arrangement of the satellites (density of satellites). The DOP increases as the density of satellites increases. However, if the DOP increases, the accuracy of positioning (positioning precision) is lowered since the mobile terminal receives signals of densely-arranged satellites.

Figure 4:
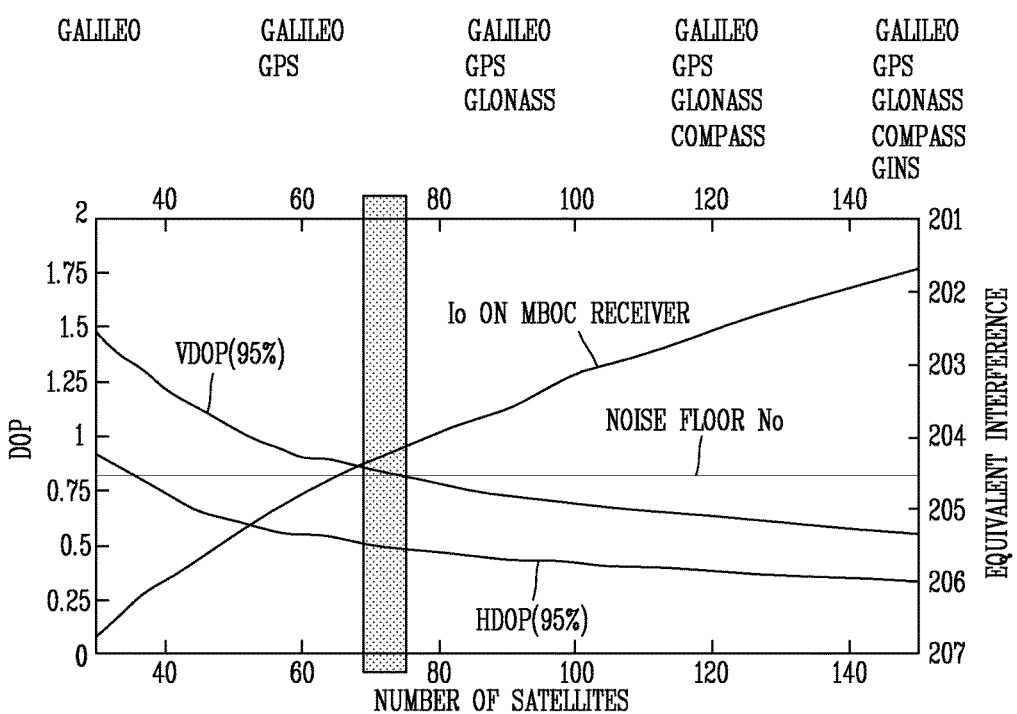
FIG. 4 is a graph showing the change of DOP according to the number of satellites.

FIG. 4 is a graph showing the change of DOP according to the number of satellites.

With reference to FIG. 4, if the number of satellites increases, both a vertical DOP (VDOP) and a horizontal DOP (HDOP) decrease. Generally, when the number of satellites is greater than about 70, DOP is good (or acceptable). However, if the number of satellites is less than 70, DOP is bad (or unacceptable) resulting in lower positioning precision.

Figure 5A:
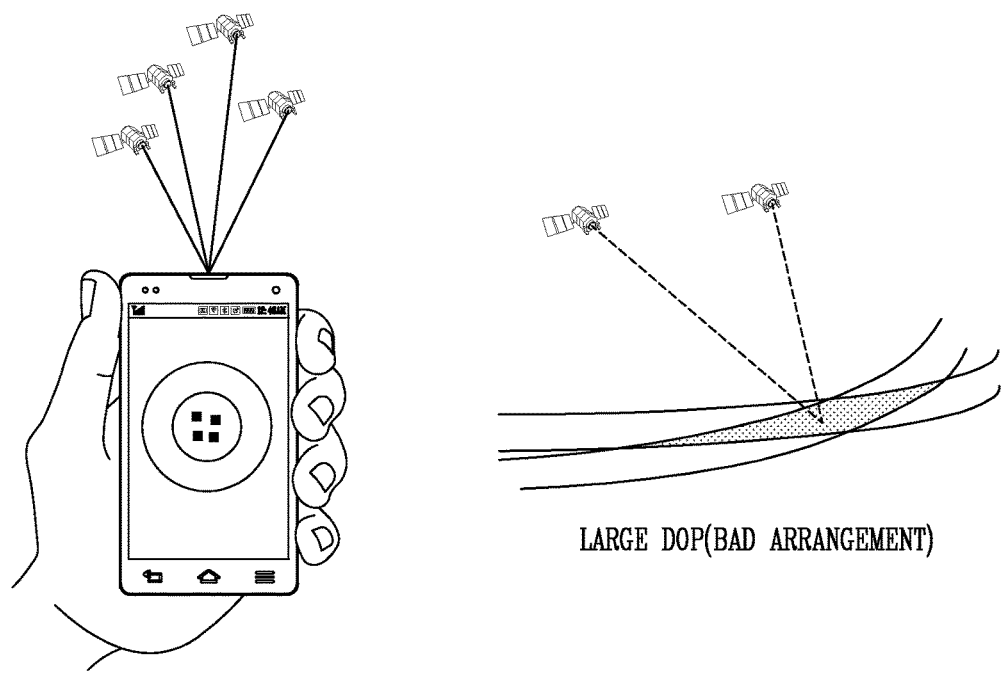
FIGS. 5A and 5B illustrate a correlation between the number of satellites and DOP.
Figure 5B:
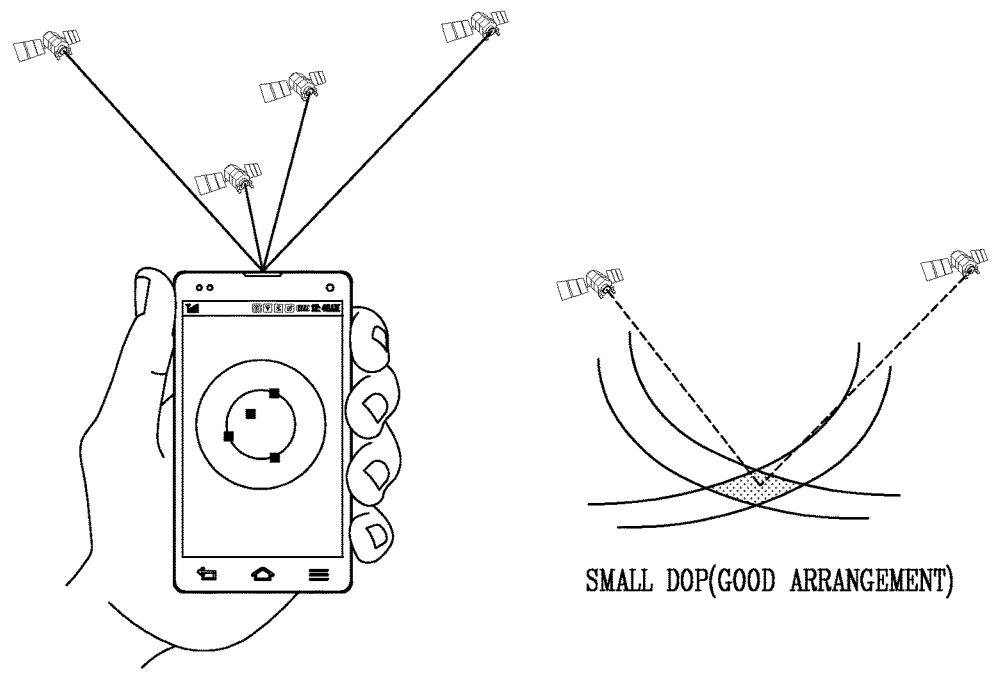

FIGS. 5A and 5B illustrate a correlation between the number of satellites and DOP.

As the number of satellites decreases or as satellites are positioned closer to each other, a dense degree (or density) of the satellites increases (i.e., a distance between satellites is shortened), and a signal strength is relatively low due to satellite signals of multi-path (multi-path signals). Therefore, when measuring DOP on the same position using a triangulation method, DOP is high when satellites are densely arranged, and DOP is low when satellites are not dense. That is, as the number of satellites decreases or as satellites are positioned closer to each other, DOP increases because the mobile terminal receives signals of the more densely arranged satellites. This may cause positioning precision to be low.

In order to solve such a problem, embodiments of the present invention provide a method for automatically selecting GNSS satellites for positioning among a plurality of satellites, based on satellite information. The satellite information may include an azimuth, an elevation, etc., and the GNSS satellites may include GPS, GLONASS, COMPASS, QZSS, Galileo, etc.

The satellite information can be checked by decoding a signal received from a specific satellite while the specific satellite performs time synchronization. Alternatively, the satellite information can be checked via download from a satellite-related server.

Figure 6:
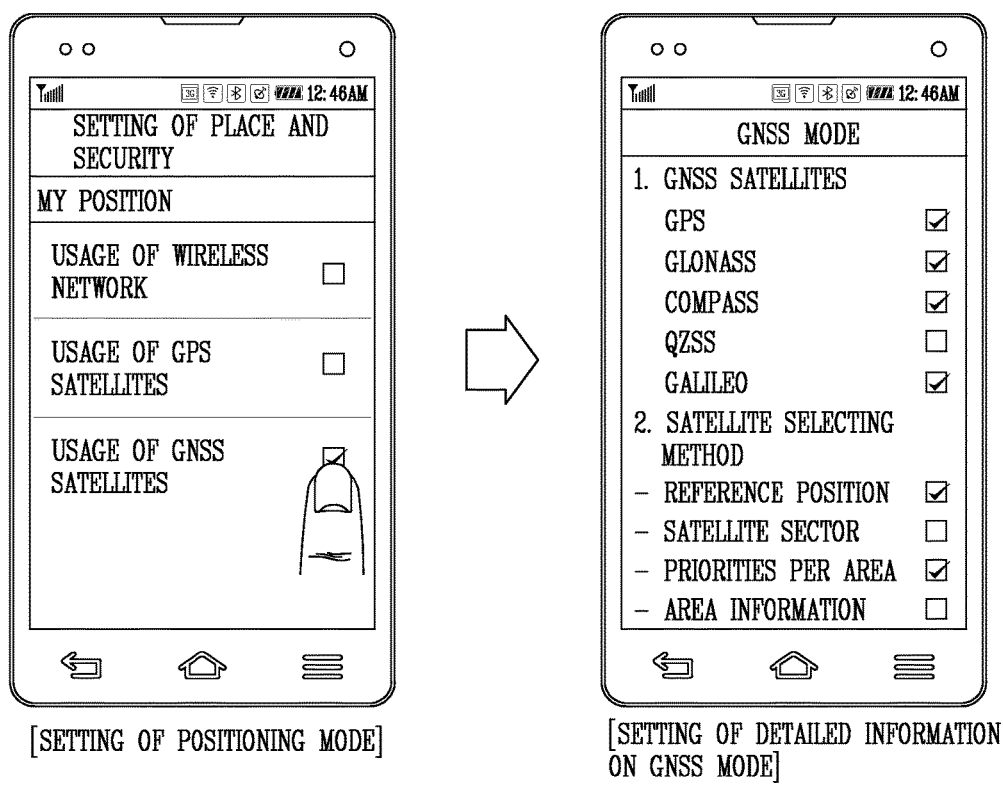
FIG. 6 illustrates an example of a satellite setting menu for selecting positioning satellites.

FIG. 6 illustrates an example of a satellite setting menu for selecting satellites to be used for positioning.

With reference to FIG. 6, a user sets a satellite mode in a satellite setting menu in a main menu.

The satellite mode may includes the following categories: a GPS mode (GPS satellite usage mode) and a GNSS mode (GNSS satellite usage mode). The GNSS mode corresponds to a mode for positioning with respect to a plurality of satellites including a GPS satellite. A menu for the GNSS mode includes an item labeled "1. GNSS SATELLITES" for setting specific satellites, and an item labeled "2. SATELLITE SELECTING METHOD" for setting a satellites selecting method. By using the items, a user sets a reference for a type of satellites to be used for positioning (e.g., GPS, GLONASS, COMPASS and Galileo), the number of satellites, and a satellite section method. The reference for selecting GNSS satellites includes a reference position, satellite sectors, priorities per area (e.g., information pre-stored through tests) and area information such as IMSI (MCC, MNC). Further, the number of satellites to be selected (e.g., minimum number of satellites or maximum number of satellites) may be added according to a user's selection.

According to an embodiment of the present invention, positioning can be performed in only a GPS mode. For example, if no mode has been set, positioning can be performed in a GPS mode. In this case, if a GPS signal has a low strength or a position error value is large, positioning can be performed in either a GPS mode or a GNSS mode. This can enhance the accuracy of positioning. When using the GNSS mode, at least one satellite of an increased number of satellites may be included in another satellite system (e.g., a pay satellite system). As such, battery consumption and charging (e.g., fees) may increase due to usage of a GNSS mode. Therefore, a user should be informed about usage of the GNSS mode so that the user can determine whether to use the GNSS mode.

According to an embodiment of the present invention, if sensitivity of selected satellites is poor or a positioning error value increases while positioning is performed in a GPS mode, the positioning is performed in GNSS mode. This can enhance the accuracy of positioning.

According to an embodiment of the present invention, if sensitivity of selected satellites is poor while positioning is performed in a GNSS mode, the number of satellites can be increased. Here, since at least one satellite of the increased number of satellites may be included in another satellite system (e.g., a pay satellite system), costs may increase when the other satellite system is used. Therefore, a pop-up message may be displayed inquiring a user whether the number of satellites is to be increased.

According to an embodiment of the present invention, if the remaining amount (e.g., charge) of a battery is less than a prescribed level while positioning is performed in a GNSS mode, the number of GNSS satellites may be automatically reduced. Here, the number of satellites to be increased or decreased may be determined based on priorities per area (e.g., information pre-stored through tests), or area information such as IMSI (MCC, MNC), or charging (e.g., fee) information (free satellite system, etc.).

According to an embodiment of the present invention, in order to reduce power consumption (e.g., battery consumption), the number of satellites may be set based on a minimum of 1 satellite and a maximum of 3 satellites. If the number of satellites is set to the minimum, positioning is performed first using a single satellite. Then, if a signal strength is low or a positioning error occurs, a number of satellites (up to the maximum number of satellites) are used for positioning.

Hereinafter, a method of selecting GNSS satellites by a mobile terminal according to embodiments of the present invention will be described with reference to the attached drawings.

Figure 7:
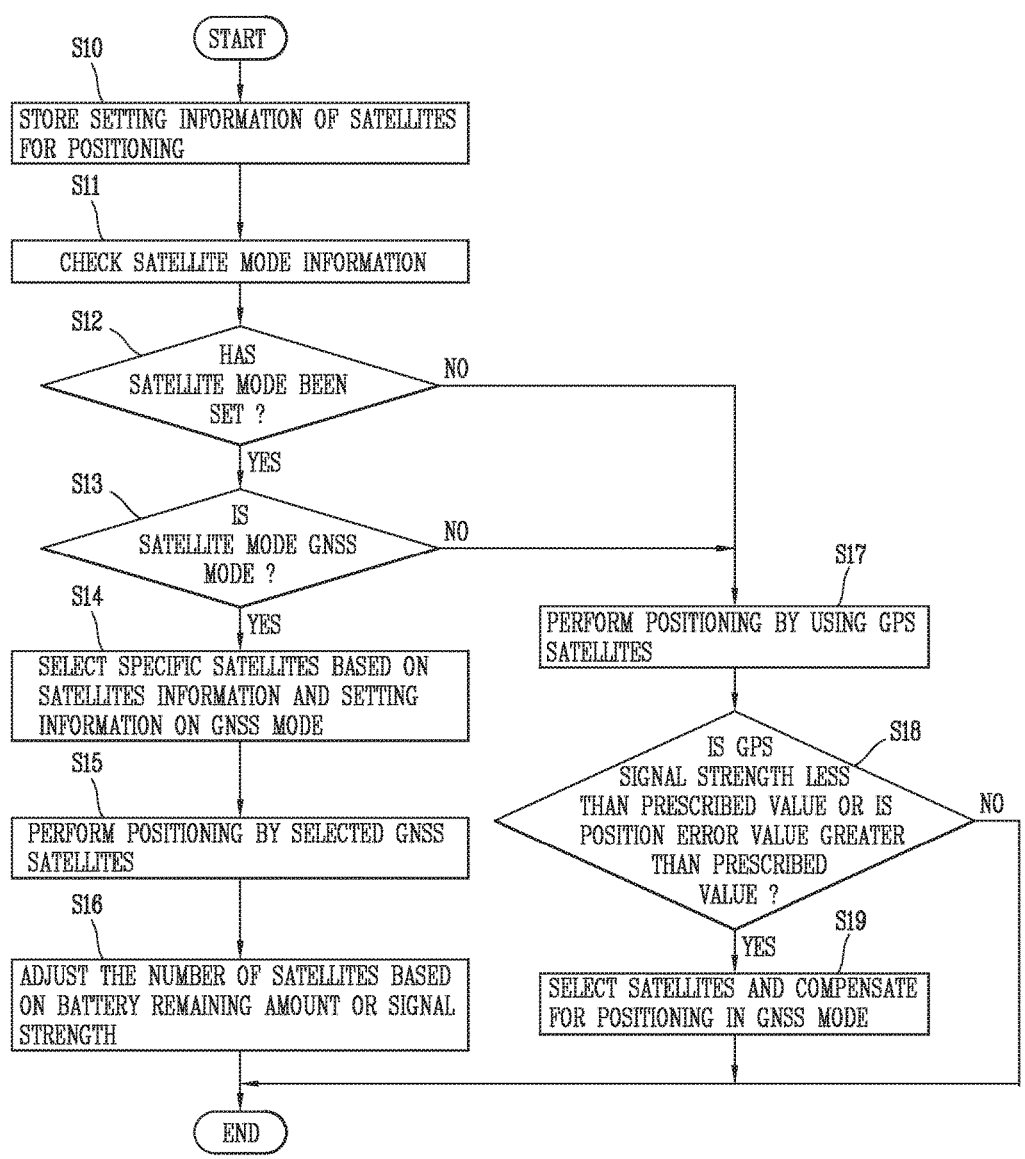
FIG. 7 is a flowchart illustrating a method of selecting positioning satellites at a mobile terminal according to an embodiment of the present invention.

FIG. 7 is a flowchart showing a method of selecting positioning satellites by a mobile terminal according to an embodiment of the present invention.

With reference to FIG. 7, a user sets a GPS mode or a GNSS mode as a satellite mode in a satellite setting menu (see, e.g., menu of FIG. 6) (S10). If a GPS mode is set, detailed information on the GPS mode may be set. Setting information including a type of the set mode (e.g., GPS mode or GNSS mode) and relevant information may be stored in the memory 160.

If a user starts a position search, the controller 180 checks the memory 160 for a set state of a satellite mode in order to check whether a satellite mode has been set (S11, S12). If the satellite mode has been set, it is determined whether the satellite mode is a GPS mode or a GNSS mode (S13).

If the satellite mode has been set as a GNSS mode, the controller 180 selects a prescribed number of GNSS satellites (e.g., a minimum or maximum number of satellites) which satisfy a prescribed DOP (or a condition related to a prescribed DOP), based on GNSS mode setting information pre-stored in the memory 160 and satellite information received from an external server (S14). Then, the controller 180 performs positioning using the selected GNSS satellites (S15). The minimum or maximum number of satellites may correspond to setting information that is preset.

As an example, the setting information may include satellite information of at least one free satellite system among a plurality of satellite systems. The controller 180 selects a prescribed number of GNSS satellites which satisfy a prescribed DOP, and then performs positioning using the selected GNSS satellites.

As another example, the setting information may include satellite information of at least two pay/free satellite systems among a plurality of satellite systems. The controller 180 selects a prescribed number of GNSS satellites which satisfy a prescribed DOP, and then performs positioning using the selected GNSS satellites. Here, the controller may inform a user that satellites included in a pay satellite system have been selected, and may perform positioning according to the user's agreement.

If a signal strength becomes low while positioning is performed by the selected GNSS satellites, the controller 180 increases the number of GNSS satellites (e.g., up to a certain maximum of, for example, 3 satellites) (S16). Also, if the remaining amount (e.g., charge) of a battery becomes less than a prescribed level, the controller 180 automatically decreases the number of GNSS satellites (e.g., down to a certain minimum of, for example, 1 satellite) (S16). When increasing the number of satellites, the number of satellites of a free satellite system may be increased first. When decreasing the number of satellites, the number of satellites of a pay satellite system may be decreased first.

If the satellite mode has not been set or the satellite mode has been set as a GPS mode, the controller 180 performs positioning using GPS satellites (S17). While positioning using the GPS satellites, the controller 180 checks whether a GPS signal strength has become low or a positioning error value exceeds a reference value (S18). If a positioning error value exceeds a reference value, the controller 180 converts from the current mode to a GNSS mode, in order to perform positioning by selecting specific GNSS satellites (S19). This can enhance the accuracy of positioning.

Figure 8:
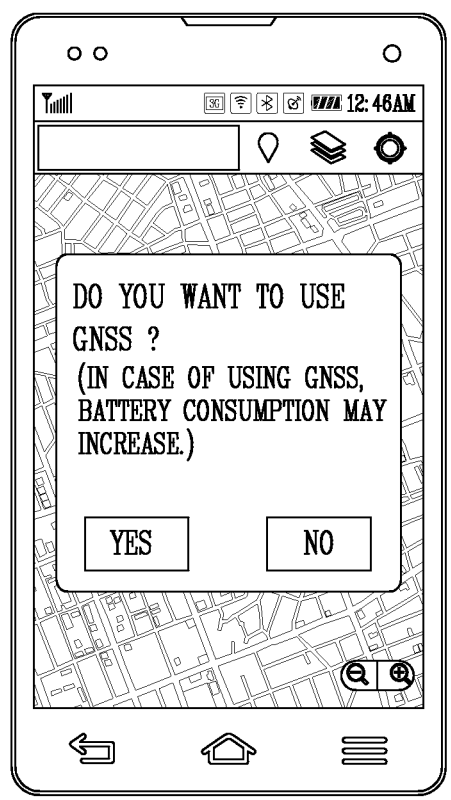
FIG. 8 illustrates an example of a message asking a user whether a satellite mode should be converted when a GPS signal strength is low.

With reference to FIG. 8, the controller 180 may provide the user with a prescribed message, such as a message inquiring whether GNSS is to be used and informing the user that battery consumption and charges (e.g., fees) may increase if the GNSS mode is used.

Hereinafter, selection of a positioning satellite in a GNSS mode according to embodiments of the present invention will be described.

FIG. 9 is a flowchart illustrating a method of selecting satellites based on a reference position in a GNSS mode.

Once a user starts a position search in a situation in which a plurality of satellites are located in space, the controller 180 determines whether a satellite mode set by the user is a GPS mode or a GNSS mode. If the set satellite mode is a GNSS mode, the controller 180 measures strengths of a plurality of signals received by the mobile terminal from the plurality of satellites (S20). Then, the controller 180 sets a satellite having a highest signal strength as a reference satellite 50 (S21) (see also FIG. 10).

Once the reference satellite 50 has been set, the controller 180 compares satellite information (e.g., azimuth and elevation) of the reference satellite 50, with satellite information of other satellites (S22). Then, the controller 180 selects satellites having a difference in satellite information difference that is greater than a predetermined value (S23). The controller 180 sequentially selects satellites, among the selected satellites, according to setting information of a GNSS mode (signal strengths, priorities per area, area information and charging information) (S24). Positioning is performed using the selected satellites (S25).

According to the method of FIG. 9, satellites for positioning are selected such that the satellites are separated by a prescribed distance therebetween in order to reduce DOP. This can enhance the accuracy of positioning. Further, multipath signals are reduced to enhance the accuracy of positioning.

FIG. 10 illustrates an example of selecting positioning satellites based on a reference position according to the method of FIG. 9.

With reference to FIG. 10, once a user starts a position search, the controller 180 determines a satellite having a highest signal strength as a reference satellite 50. Then, the controller 180 selects a plurality of candidate satellites 51, 52, 53, 54 and 55. Each of the candidate satellites 51, 52, 53, 54 and 55 has an azimuth which is out of the range of azimuth (A) based on the reference satellite 50.

The controller 180 performs positioning by sequentially applying a preset number of satellites (e.g., 53, 51, 52, 54, 55) in order of high signal strengths, among the selected satellites 51, 52, 53, 54, 55 according to a menu setting. In the example of FIG. 10, azimuths of satellites are compared with each other for selection of positioning satellites. However, it is appreciated that elevations of satellites may be compared with each other. Comparing azimuths of satellites with each other is performed under an assumption that the satellites have almost the same elevation. If a plurality of satellites have different elevations, the selected satellites are satellites that are farthest from a reference satellite.

Referring to FIG. 10, once a reference satellite is set, the controller 180 selects a plurality of candidate satellites 51, 52, 53, 54, 55, each candidate satellite having an azimuth (A) which is out of the range of the azimuth (A) based on the reference satellite 50. If there are a plurality of candidate satellites to be selected, the controller may first select satellites having higher elevations. Therefore, the controller 180 selects the candidate satellites 51, 54 each having an elevation higher than the elevation (E) of the reference satellite 50. Then, the controller 180 sequentially applies the satellites 51, 54 in order of higher signal strengths.

Figure 11:
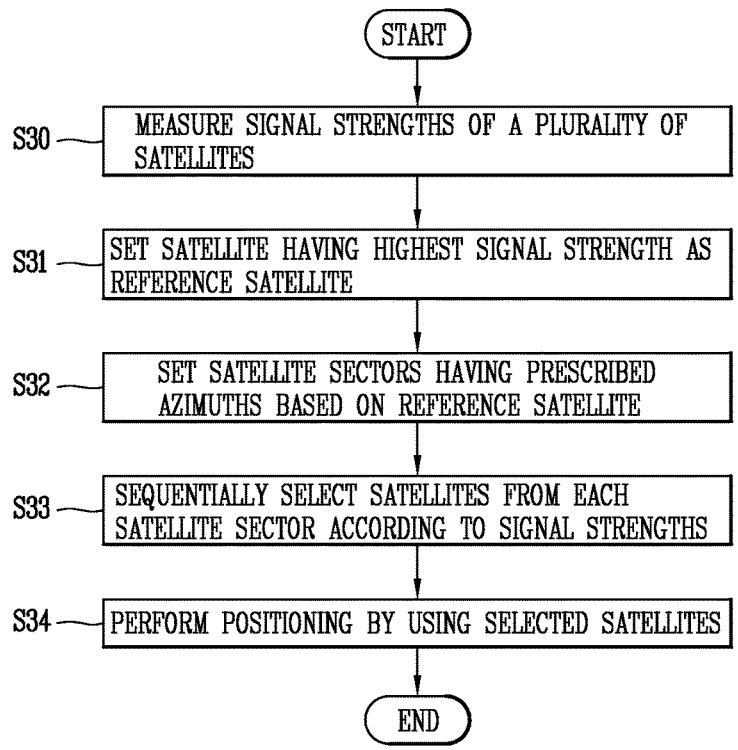
FIG. 11 is a flowchart illustrating a method of selecting positioning satellites based on satellite sectors in a GNSS mode according to an embodiment of the present invention.

FIG. 11 is a flowchart illustrating a method of selecting positioning satellites based on satellite sectors in a GNSS mode according to an embodiment of the present invention.

With reference to FIG. 11, once a user starts a position search, the controller 180 determines whether a satellite mode set by the user is a GPS mode or a GNSS mode. If the set satellite mode is a GNSS mode, the controller 180 measures strengths of a plurality of signals received by the mobile terminal from the plurality of satellites (S30). Then, the controller 180 sets a satellite having a highest signal strength as a reference satellite 60 (S31) (see also FIG. 12).

If a satellite mode set by the user is a GNSS mode, the controller 180 divides a satellite space into a plurality of satellite sectors according to azimuth and elevation (S32). Then, the controller 180 sequentially selects, from each sector, GNSS satellites of a preset number, based on setting information of a GNSS mode (e.g., based on signal strengths) (S33). The sectors may be determined according to a prescribed azimuth and elevation based on a reference satellite. Positioning is performed using the selected satellites (S34).

With reference to FIG. 11, satellite sectors are sorted relative to each other based on a reference satellite. However, according to other embodiments of the present invention, it is not necessary that satellite sectors be sorted in this manner. For instance, satellite sectors may be sorted relative to each other based on a vertical line by 30°.

Selecting positioning satellites based on satellite sectors is effective in greatly reducing the time taken to search for satellites to be used for positioning, and in reducing the number of satellites.

Figure 12:
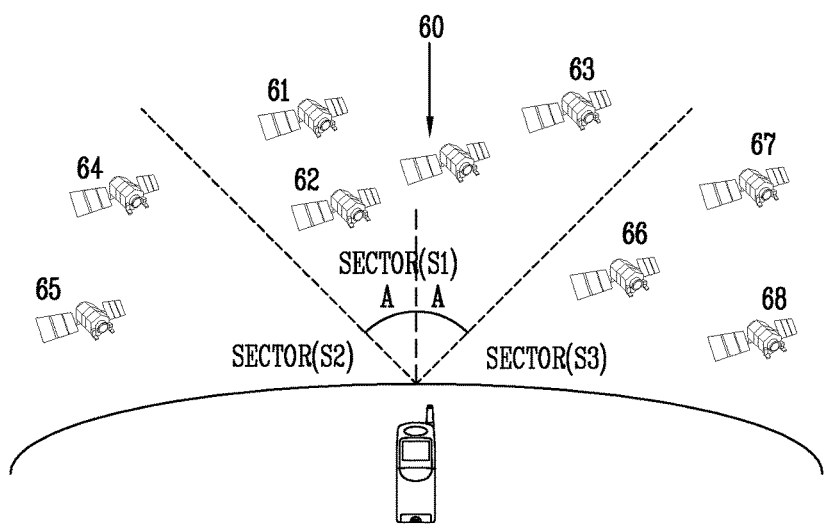
FIG. 12 illustrates an example of selecting positioning satellites based on the method of FIG. 11.

FIG. 12 illustrates an example of selecting positioning satellites based on the method of FIG. 11.

Once a user starts a position search, the controller 180 sorts a plurality of satellites according to a plurality of sectors (candidate sectors) based on information of the satellites (azimuth, elevation). For instance, the controller 180 divides a satellite space into a plurality of satellite sectors 51, S2, S3 at constant intervals in azimuth (2A=30°). Under such a divided configuration, satellites 60, 61, 62, 63 are included (or categorized as being located) in the satellite sector 51, satellites 64, 65 are included in the satellite sector S2, and satellites 66, 67, 68 are included in the satellite sector S3. Therefore, the controller 180 sequentially selects satellites having high signal strengths from each candidate sector, e.g., satellites 60, 64, 66, for performing positioning.

According to another embodiment, the controller 180 may first select a satellite of a same satellite system as the reference satellite 60, from among at least two satellites having a signal strength difference within a prescribed range, from each candidate sector.

According to another embodiment, the controller 180 may first select a satellite which belongs to a free satellite system, from among at least two satellites having a signal strength difference within a prescribed range, from each candidate sector.

According to another embodiment, if a user has set a free satellite system, the controller 180 may deactivate a sector including only satellites which belong to a pay satellite system, in order to exclude the sector from the candidate sectors.

The size of the sector may be variable. For instance, if there is no satellite in the sorted satellite sectors S1, S2, S3, the controller 180 may subdivide the satellite sectors using an azimuth and an elevation. In contrast, if more than a prescribed number of satellites are located in the plurality of satellite sectors S1, S2, S3, the controller 180 may decrease the range of the satellite sectors using an azimuth and an elevation.

According to the methods of FIGS. 9 and 11 and the examples of FIGS. 10 and 12, the controller sequentially selects (or applies) satellites according to setting information of a GNSS mode (e.g., signal strengths, priorities per area, area information, and charging information), in order to perform positioning.

According to embodiments of the present invention, signal strengths of satellites are used as a reference for selecting optimum positioning satellites. However, if the difference of signal strengths of corresponding satellites is less than a prescribed value, priorities per area, area information, and charging information may be selectively applied according to a satellite setting menu.

In order to select satellites according to priorities per area, a type of satellites to be selected per area should be pre-stored. A user checks a type of satellites that is expected to be optimal per area through tests, and then stores information on the type in the memory 160. As an example, if a minimum number of satellites are to be used in Korea, a GPS satellite is selected. On the other hand, if a maximum number of satellites (e.g., 3 satellites) are to be used in Korea, a GPS satellite, a Glonass satellite and a QZSS satellite are additionally selected.

A method of selecting satellites based on area information may be performed together with a method of selecting satellites based on priorities per area. The method of selecting satellites based on area information includes selecting GNSS satellites by checking a user's position based on a user's IMSI (International Mobile Subscriber Identity). The IMSI includes a Mobile Country Code (MCC) and a Mobile Network Code (MNC).

If a user starts a position search, the controller 180 analyzes an MCC value of the IMSI of the mobile terminal according to a satellite setting menu, in order to check a country (e.g., Korea: 450). Then, the controller 180 selects satellites to be used (GPS→Glonass→QZSS). In particular, when first using a minimum number of satellites, only a GPS satellite is selected. In this situation, if a signal strength is low, a maximum number of satellites (e.g., three satellites) are later used (e.g., selecting GPS, Glonass and QZSS in an integrated manner). Generally, when the number of satellites is increased, charging (of fees) may be increased. In this case, a pop-up message (e.g., a message similar to the message of FIG. 8) may be displayed asking a user whether the number of satellites is to be increased.

The IMSI of the mobile terminal may be acquired from a USIM or information from a base station. However, if the mobile terminal has no USIM or if the mobile terminal has an inferior communication with a base station, a user may directly input area information. Alternatively, the user may input area information by accessing another communication medium (e.g., the Internet) using a short-range communication network, in order to select a GNSS satellite based on the area information.

According to embodiments of the present invention, since DOP decreases as the number of positioning satellites increases, satellites to be used for positioning are automatically selected from GNSS satellites, based on satellite information and a user's menu setting. This can enhance the accuracy of positioning, and can reduce battery consumption.

In accordance with embodiments of the present invention, methods disclosed herein may be implemented as computer-readable program code stored in a computer-readable storage medium. Examples of the storage medium may include ROM, RAM, CD-ROM, magnetic tape, floppy disk, an optical data storage device, etc. Also, the storage medium may be implemented as a carrier wave (e.g., for transmission through the Internet). The computer may include the controller 180 of the mobile terminal.

Disclosed embodiments and features are merely exemplary and are not to be considering as limiting the scope of the present disclosure. Rather, it is understood that features disclosed can be readily applied to other types of apparatuses and devices. It is intended that this disclosure be illustrative, and not limiting with respect to the scope of the claims. Various alternatives, modifications, and variations will be apparent to those skilled in the art. The features, structures, methods, and other characteristics of embodiments described herein may be combined in various ways to obtain additional and/or alternative exemplary embodiments.

As features disclosed may be embodied in various forms without departing from the characteristics (or spirit) of these features, it should also be understood that the embodiments of the present invention are not limited by any of the details described herein, unless otherwise specified. Rather, these features should be construed broadly within their scope as defined, for example, in the appended claims, and it is intended that all changes and modifications that fall within the metes and bounds of the claims, or equivalents of such metes and bounds, are to be embraced by the appended claims.

What is claimed is:

1. A method of selecting positioning satellites by a mobile terminal, the method comprising:
storing, in a memory, setting information of a satellite mode regarding a plurality of satellites;
sequentially selecting, in a GPS mode by a controller, GPS satellites required for positioning, among the plurality of satellites, that satisfy a condition relating to dilution of precision (DOP) based on satellite information and user selected items of the stored setting information;
performing first positioning of the mobile terminal using the selected GPS satellites;
changing from the GPS mode to a Global Navigation Satellite System (GNSS) mode when a signal strength of a satellite of the selected GPS satellites is less than a defined value or when error of the first positioning is greater than a defined value;
sorting in the GNSS mode a plurality of GNSS satellites according to a plurality of candidate sectors based on an azimuth and an elevation of each satellite of the plurality of GNSS satellites, the plurality of GNSS satellites including GPS satellites not included in the GPS satellites selected in the GPS mode, Global Navigation Satellite System (GLONASS) satellites, COMPASS satellites, Quasi-Zenith Satellite System (QZSS) satellites, and Galileo satellites;
sequentially selecting in the GNSS mode, from each of the plurality of candidate sectors, GNSS satellites based on signal strength, priorities per area, International Mobile Station Identity (IMSI), and charge information; and
performing second positioning of the mobile terminal, while in the GNSS mode, using location information obtained from the selected GPS satellites when in the GPS mode and location information obtained from the selected GNSS satellites when in the GNSS mode.

2. The method of claim 1, wherein the user selected items of the setting information are set in a satellite setting menu, wherein each item of the setting information is individually selectable by a user, and wherein the setting information comprises a satellite mode, a satellite type, a satellite selection method, satellite selecting priorities per area, a number of satellites to be selected, and the charge information.

3. The method of claim 1, wherein each of the plurality of satellites belongs to a free satellite system or a pay satellite system, the plurality of satellites including the GPS satellites, the GLONASS satellites, the COMPASS satellites, the QZSS satellites, and the Galileo satellites.

4. The method of claim 1, wherein:
the satellite information includes a signal strength, an azimuth and an elevation; and
the satellite information is directly measured from a satellite signal, or is received from an external server.

5. The method of claim 1,
wherein the performing the first positioning of the mobile terminal using the selected GPS satellites includes:
checking whether a satellite mode has been set; and
performing positioning using the Global Positioning System (GPS) satellites if either no satellite mode has been set or the GPS mode has been set.

6. The method of claim 1, wherein prior to the selecting the GNSS satellites, the method further comprises displaying a pop-up with a message asking a user whether to convert to the GNSS mode and information informing that battery consumption and changes may increase if the GNSS mode is used.

7. The method of claim 1, wherein:
the GPS satellites belong to a free satellite system; and
the GNSS satellites belong to a free satellite system or a pay satellite system.

8. The method of claim 1, wherein the selecting the GNSS satellites in the GNSS mode includes:
selecting a satellite of the plurality of satellites having a highest signal strength as a reference satellite;

comparing an azimuth and an elevation of the reference satellite with azimuths and elevations of other satellites of the plurality of satellites;

selecting satellites of the other satellites having prescribed differences in azimuth and elevation with respect to the azimuth and the elevation of the reference satellite as candidate satellites; and sequentially selecting the GNSS satellites from the candidate satellites according to the signal strengths or the priorities per area.

9. The method of claim 1, wherein the sequentially selecting, from each of the plurality of candidate sectors, the GNSS satellites includes, firstly selecting from each of the plurality of candidate sectors a satellite belonging to a same satellite system as a reference satellite or a satellite belonging to a free satellite system from among at least two satellites having a signal strength difference within a prescribed range when the GNSS satellites are selected based on the signal strength.

10. The method of claim 9, wherein a sector of the plurality of candidate sectors include only satellites belonging to a pay satellite system is excluded as a candidate sector if a user has selected the free satellite system.

11. The method of claim 1, wherein a number of the selected GPS satellites corresponds to a minimum number or a maximum number based on the stored setting information.

12. The method of claim 1, further comprising adjusting a number of satellites used for performing the first positioning based on a signal strength, positioning accuracy, and a remaining charge of a battery of the mobile terminal.

13. The method of claim 12, wherein:
a number of satellites belonging to a free satellite system is first increased if the adjusting the number of satellites comprises increasing the number of satellites used for performing the first positioning; and
a number of satellites belonging to a pay satellite system is first decreased if the adjusting the number of satellites comprises decreasing the number of satellites used for performing the first positioning.

14. The method of claim 12, wherein the performing the first positioning of the mobile terminal using the selected GPS satellites comprises using a maximum number of satellites according to priorities if the signal strength or the positioning accuracy is less than a prescribed value and the number of satellites used for performing the first positioning has been set to a minimum number.

15. The method of claim 12, wherein the performing the first positioning of the mobile terminal using the selected GPS satellites comprises using a minimum number of satellites if a remaining charge of a battery of the mobile terminal is less than a prescribed level and the number of satellites used for performing the first positioning has been set to a maximum number.

16. A mobile terminal comprising:
a memory configured to store setting information of a satellite mode regarding a plurality of satellites;
a display configured to display information regarding the plurality of satellites; and
a controller configured to:
sequentially select, in a GPS mode, GPS satellites required for positioning, among the plurality of satellites, that satisfy a condition relating to dilution of precision (DOP) based on satellite information and user selected items of the stored setting information;
perform first positioning of the mobile terminal using the selected GPS satellites, change from the GPS mode to a Global Navigation Satellite System (GNSS) mode when a signal strength of a satellite of the selected GPS satellites is less than a defined value or when error of the first positioning is greater than a defined value;

sort in the GNSS mode a plurality of GNSS satellites according to a plurality of candidate sectors based on an azimuth and an elevation of each satellite of the plurality of GNSS satellites, the plurality of GNSS satellites including GPS satellites not included in the GPS satellites selected in the GPS mode, Global Navigation Satellite System (GLONASS) satellites, COMPASS satellites, Quasi-Zenith Satellite System (QZSS) satellites, and Galileo satellites;

sequentially select in the GNSS mode, from each of the plurality of candidate sectors, GNSS satellites based on signal strength, priorities per area, International Mobile Station Identity (IMSI), and charge information; and perform second positioning of the mobile terminal, while in the GNSS mode, using location information obtained from the selected GPS satellites when in the GPS mode and location information obtained from the selected GNSS satellites when in the GNSS mode.

17. The mobile terminal of claim 16, wherein the user selected items of the setting information are set in a satellite setting menu, the setting information comprising a satellite mode, a satellite type, a satellite selection method, satellite selecting priorities per area, a number of satellites to be selected, and the charge information.

18. The mobile terminal of claim 16, wherein each of the plurality of satellites belongs to a free satellite system or a pay satellite system, the plurality of satellites including the GPS satellites, the GLONASS satellites, the COMPASS satellites, the QZSS satellites, and the Galileo satellites.

19. The mobile terminal of claim 16, wherein:
the satellite information includes a signal strength, an azimuth and an elevation; and
the satellite information is directly measured from a satellite signal or is received from an external server.

20. The mobile terminal of claim 16, wherein the controller is further configured to:
perform the first positioning of the mobile terminal using the selected Global Positioning System (GPS) satellites if either no satellite mode has been set or the GPS mode has been set.

21. The mobile terminal of claim 16, wherein the controller is further configured to control the display to display a pop-up with a message asking a user whether to convert to the GNSS mode when converting to the GNSS mode and information informing that battery consumption and changes may increase if the GNSS mode is used.

22. The mobile terminal of claim 16, wherein the controller is further configured to:
select a satellite of the plurality of satellites having a highest signal strength as a reference satellite if the GNSS mode has been set;
compare an azimuth and an elevation of the reference satellite with azimuth and elevations of other satellites of the plurality of satellites;
select satellites of the other satellites having a prescribed difference in azimuth and elevation with respect to the azimuth and the elevation of the reference satellite as candidate satellites; and
sequentially select the GNSS satellites from the candidate satellites according to the signal strengths or the priorities per area.

23. The mobile terminal of claim 16, wherein the controller is further configured to firstly select from each of the the plurality of candidate sectors a satellite belonging to a same satellite system as a reference satellite or a satellite belonging to a free satellite system from among at least two satellites having a signal strength difference within a prescribed range when the GNSS satellites are selected based on the signal strength.

24. The mobile terminal of claim 16, wherein the controller is further configured to adjust a number of satellites used for the first positioning based on a signal strength, positioning accuracy, and a remaining charge of a battery of the mobile terminal.

25. The mobile terminal of claim 24, wherein the controller is further configured to:
first increase a number of satellites belonging to a free satellite system if the number of satellites used for the first positioning is to be increased; and
first decrease a number of satellites belonging to a pay satellite system if the number of satellites used for the first positioning is to be decreased.

26. The mobile terminal of claim 24, wherein the controller is further configured to perform the first positioning of the mobile terminal using the selected GPS satellites using a maximum number of satellites according to priorities if the signal strength or the positioning accuracy is less than a prescribed value and the number of satellites used for the performing the first positioning has been set to be a minimum number.

27. The mobile terminal of claim 24, wherein the controller is further configured to perform the first positioning of the mobile terminal using the selected GPS satellites using a minimum number of satellites if a remaining charge of a battery is less than a prescribed level and the number of satellites used for the performing the first positioning has been set to a maximum number.

\* \* \* \* \*